(12) United States Patent
Likitvanichkul

(10) Patent No.: US 8,454,887 B2
(45) Date of Patent: Jun. 4, 2013

(54) METHOD FOR PORE SIZE DISTRIBUTION CONTROL IN A FIRED CERAMIC ARTICLE

(75) Inventor: Sumalee Likitvanichkul, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 336 days.

(21) Appl. No.: 12/949,320

(22) Filed: Nov. 18, 2010

(65) Prior Publication Data

US 2011/0129663 A1 Jun. 2, 2011

Related U.S. Application Data

(60) Provisional application No. 61/265,180, filed on Nov. 30, 2009.

(51) Int. Cl.
*B29B 11/14* (2006.01)
*B29B 11/10* (2006.01)

(52) U.S. Cl.
CPC *B29B 11/14* (2013.01); *B29B 11/10* (2013.01)
USPC .......................................... 264/630; 264/631

(58) Field of Classification Search
USPC .................................. 264/630, 631
See application file for complete search history.

(56) References Cited

U.S. PATENT DOCUMENTS

| 3,338,995 | A | * | 8/1967 | Sowards | 264/44 |
| 5,332,703 | A | | 7/1994 | Hickman | 501/119 |
| 6,004,501 | A | * | 12/1999 | Cornelius et al. | 264/631 |
| 6,087,281 | A | | 7/2000 | Merkel | 501/9 |
| 6,089,860 | A | | 7/2000 | Dull et al. | 432/72 |
| 6,221,308 | B1 | | 4/2001 | Peng | 264/630 |
| 6,864,198 | B2 | | 3/2005 | Merkel | 501/80 |
| 7,429,351 | B2 | | 9/2008 | Toda et al. | 264/630 |
| 7,445,745 | B2 | | 11/2008 | Peterson | 264/630 |
| 7,485,170 | B2 | | 2/2009 | Beall et al. | 55/523 |
| 7,520,911 | B2 | * | 4/2009 | Beall et al. | 55/523 |
| 7,704,296 | B2 | * | 4/2010 | Merkel | 55/523 |
| 2004/0148916 | A1 | * | 8/2004 | Merkel | 55/523 |
| 2007/0141301 | A1 | * | 6/2007 | Boorom et al. | 428/116 |
| 2008/0110143 | A1 | | 5/2008 | Chen et al. | 55/385.1 |

FOREIGN PATENT DOCUMENTS

| EP | 0 133 021 | 3/1987 |
| EP | 1 106 589 | 6/2001 |
| WO | 99/32844 | 7/1999 |
| WO | 2007/075333 | 7/2007 |
| WO | 2008-027219 A2 | 3/2008 |

* cited by examiner

*Primary Examiner* — Joseph S Del Sole
*Assistant Examiner* — Russell Kemmerle, III
(74) *Attorney, Agent, or Firm* — John L. Haack

(57) ABSTRACT

A method for producing high porosity ceramic substrate articles including a fire-cycle or firing schedule that includes fast-heating rates, as defined herein.

17 Claims, 2 Drawing Sheets

US 8,454,887 B2

METHOD FOR PORE SIZE DISTRIBUTION CONTROL IN A FIRED CERAMIC ARTICLE

CLAIMING BENEFIT OF PRIOR FILED U.S. APPLICATION

This application claims the benefit of U.S. Provisional Ser. No. 61/265,180, filed on Nov. 30, 2009. The content of this document and the entire disclosure of any publication or patent document mentioned herein are incorporated by reference.

FIELD

The disclosure relates generally to high porosity ceramic articles and to a method for pore size distribution control in the ceramic article.

SUMMARY

The disclosure provides a method of manufacturing high porosity ceramic substrate articles. The method controls the pore size properties in the resulting fired ceramic articles by selection and control of the heating rates in the fire-cycle.

BRIEF DESCRIPTION OF THE DRAWING(S)

In embodiments of the disclosure:

DETAILED DESCRIPTION

Figure 1:
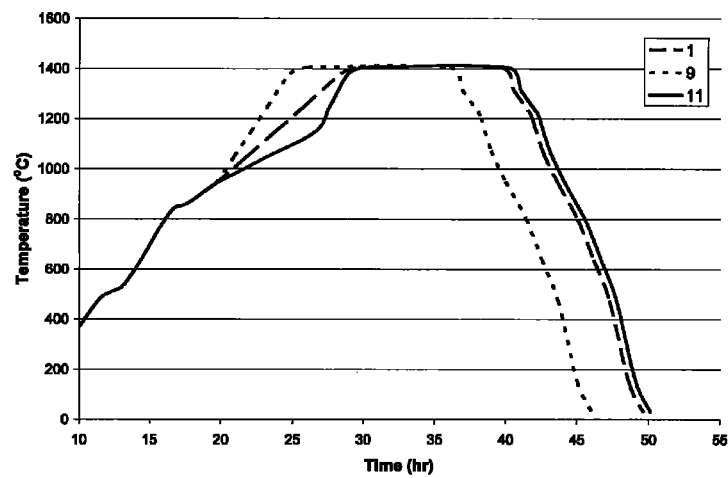
FIG. 1 shows exemplary fire-cycle profiles for ceramic firing.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments for the claimed invention.

Definitions

Porosity, median pore diameter (MPD), and pore size distribution (PSD), and like characteristics of the cordierite ceramic bodies of the disclosure are mentioned in commonly owned and assigned U.S. Pat. No. 6,864,198. Such parameters as $d_{10}$, $d_{50}$ and $d_{90}$ relate to the pore size distribution. The quantity $d_{50}$ is the median pore size based upon pore volume, and is measured in micrometers; thus, $d_{50}$ is the pore diameter at which 50% of the open porosity of the ceramic has been intruded by mercury. The quantity $d_{90}$ is the pore diameter at which 90% of the pore volume is comprised of pores whose diameters are smaller than the value of $d_{90}$; thus, $d_{90}$ is equal to the pore diameter at which 10% by volume of the open porosity of the ceramic has been intruded by mercury. The quantity $d_{10}$ is the pore diameter at which 10% of the pore volume is comprised of pores whose diameters are smaller than the value of $d_{10}$; thus, $d_{10}$ is equal to the pore diameter at which 90% by volume of the open porosity of the ceramic has been intruded by mercury. The values of $d_{10}$ and $d_{90}$ are also in units of micrometers. The quantity $(d_{50}-d_{10}/d_{50})$ describes the width of the distribution of pore sizes finer than the median pore size, $d_{50}$.

"Pore fraction" refers to the percent by volume of porosity, as measured by mercury porosimetry, divided by 100.

"Porosity" and like terms refer to the total void space in a honeycomb material attributable to the presence of pores, or the ratio of the pore volume to the total volume of a material.

"Pore volume" and like terms refer to the total void space in a material attributable to the presence of pores in units of volume percent.

"Pore compensation" and like terms refer to an adjustment to or change in a specific pore size by an adjustment in the firing cycle.

"Median pore diameter" and like terms refer to a middle pore size, as measured in cross-section or diameter, of an ordered set or distribution of pore sizes.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, and like values, and ranges thereof, that may be employed in describing the embodiments of the disclosure, refers to variation in the numerical quantity that can occur, for example: through typical measuring and handling procedures used for making the ceramic compositions, and articles; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture. The claims appended hereto include equivalents of these "about" quantities.

"Consisting essentially of" in embodiments refers, for example, to a green body and ceramic compositions, to a method of making or using the green body and ceramic compositions, or formulation, and articles, devices, or any apparatus of the disclosure, and can include the components or steps listed in the claim, plus other components or steps that do not materially affect the basic and novel properties of the compositions, articles, apparatus, or methods of making and use of the disclosure, such as particular reactants, particular additives or ingredients, a particular agents, a particular surface modifier or condition, or like structure, material, or process variable selected. Items that may materially affect the basic properties of the components or steps of the disclosure or that may impart undesirable characteristics to the present disclosure include, for example, excessive departures from the disclosed firing profiles, and like steps.

The indefinite article "a" or "an" and its corresponding definite article "the" as used herein means at least one, or one or more, unless specified otherwise.

Abbreviations, which are well known to one of ordinary skill in the art, may be used (e.g., "h" or "hr" for hour or hours, "g" or "gm" for gram(s), "mL" for milliliters, and "rt" for room temperature, "nm" for nanometers, and like abbreviations).

Specific and preferred values disclosed for components, ingredients, additives, times, temperatures, and like aspects, and ranges thereof, are for illustration only; they do not exclude other defined values or other values within defined ranges. The compositions and methods of the disclosure include those having any value or any combination of the values, specific values, more specific values, and preferred values described herein.

Porosity, such as determined by pore size, is a property of an automotive filter substrate or like articles, which can have a significant impact on water absorption. Water absorption can influence catalyst coating control. In addition, a pore size distribution skewed toward a larger pore size range can be preferred, for example, to benefit microcrack dimensions. Our preliminary work based on empirical calculations suggested that filter substrates having larger mean pore size diameters, rather than the current smaller mean pore size diameters, could be used to improve thermal shock resistance. We investigated the impact of the green body firing cycle or fire-cycle on the porosity of the resulting ceramic article, for example, EX-20 Celcor® bodies and substrates. The results indicated that a temperature range including a 1,160° C. soak temperature can be a significant factor in controlling pore size due to, for example, "talc melting" and "eutectic talc melting" events. Variation in raw materials, such as talc, particle size, and particle morphology, has been shown to impact porosity and pore size distribution. The porosity property can also be modified using pore former additives, such as graphite, organic starches, polymers, and like materials, or mixtures thereof. Pore formers have been used extensively in diesel filter product manufacture, such as aluminum titanate (AT) and like cordierite compositions. For example, U.S. Pat. No. 7,445,745, entitled "Method for Fabricating Ceramic Articles" mentions batch components having a pore former. WO 9932844 (A1) entitled "Method for Firing Ceramic Honeycomb Bodies and a Tunnel Kiln Used Therefor" mentions a method of firing cellular ceramic bodies, and to a tunnel kiln adapted for such a firing method.

It has been discovered that the problem of controlling pore size properties, such a pore size and pore size distribution, in a ceramic substrate article can be overcome, by for example, firing a green body article at prescribed times and temperatures, as defined herein.

In embodiments, the disclosure provides compositions, articles, and methods for making and using porous substrate articles.

In embodiments, the disclosure provides a method for pore size distribution control in a fired ceramic article comprising:

selecting a batch composition for a green body precursor to the fired ceramic article;

selecting a pore size distribution, e.g., the PSD as measure by intrusion vol %, in the fired ceramic article comprising a first, a second, and a third pore size distribution;

calculating a heating-rate for firing the green body precursor; and firing a green body precursor having the selected batch composition according to the calculated heating-rate, the median pore size diameter (MPD) of the fired ceramic article being greater than or equal to 5 micrometers.

In embodiments, the method can include:

the first pore size distribution having pores of a diameter of less than 2 microns ($PSD_{<2}$);

the second pore size distribution having pores of a diameter of 2 to 5 microns ($PSD_{2-5}$); and the third pore size distribution having pores of a diameter of 5 to about 10 microns ($PSD_{5-10}$).

In embodiments, the disclosure provides a method to control the pore size distribution of a fired ceramic substrate comprising:

selecting a pore size distribution (PSD) desired in a fired ceramic substrate;

determining the fire-cycle for the selected pore size distribution with the formulas:

$$PSD_{<2}=14.84387+[-3.1142*(HR_C-Av_C)/R_C]+[-5.2783*(HR_D-Av_D)/R_D];$$

$$PSD_{2-5}=41.10153+[0.864341*(HR_B-Av_B)/R_B]+[-0.79765*(HR_C-Av_C)/R_C]+[-4.81606*(HR_D-Av_D)/R_D]+[-1.22864*((HR_A-Av_A)/R_A)*((HR_B-Av_B)/R_B)]+[-1.50316*((HR_C-Av_C)/R_C)*((HR_D-Av_D)/R_D)]; \text{ and}$$

$$PSD_{5-10}=28.95511+[3.181182*(HR_C-Av_C)/R_C]+[7.566505*(HR_D-Av_D)/R_D];$$

where

PSD is the pore size distribution in % vol, $PSD_{<2}$ is the pore size distribution of pores having a diameter of less than 2 microns, $PSD_{2-5}$ is the pore size distribution of pores having a diameter of 2 to 5 microns, $PSD_{5-10}$ is the pore size distribution of pores having a diameter of 5 to about 10 microns, HR is the heating rate in ° C./hour, Av is the average of the low and high heating rates, R is the range of the low to high heating rates divided by 2, and the subscripts are the respective first (A), second (B), third (C), and fourth (D) temperature factor ranges; and firing a green body substrate according to the determined fire-cycle.

Firing a green body substrate according to the determined fire-cycle refers to a one or more fire-cycle parameters, that is, the heating rate at or within a desired temperature factor range or ranges, and can further include having a consistent or constant, for example with respect to reproducibility, heat-up or pre-heating prior to the desired temperature range(s), a constant maximum temperature, a constant holding time, and a constant cool down cycle.

In embodiments, the temperature ranges can include, for example, a first range (A) of 950 to 1,050° C., a second range (B) of 1,050 to 1,150° C., a third range (C) of 1,150 to 1,250° C., and a fourth range (D) of 1,250 to 1,350° C. In embodiments, these temperature ranges also identify and refer to temperature factors that are used in the multiple response regression analysis.

In embodiments, the green body substrate can include, for example, a batch composition comprising alumina and talc. The talc can comprise particles that can have, for example, a larger particle size, such as having a median particle size of about 10 to about 16 microns, in from about 35 to about 45 weight percent of the total weight percent of the green body. In embodiments, it is desirable to have the cordierite talc particles having controlled melt properties and which talc particles completely melt at specific times and temperatures.

In embodiments, the porosity of the fired ceramic substrate is substantially constant, for example, within the same piece, i.e., isotropically or having physical properties that do not substantially vary with direction, between or among pieces, i.e., piece-to-piece, batch-to-batch, and temporally, i.e., within the same successive time-frames, such as hour-to-hour, day-to-day, month-to-month, or like intervals of continuous or intermittent batch manufacture.

In embodiments, the fire-cycle can be, for example, substantially independent of the cordierite composition. Porosity of certain cordierite compositions can be independent of fire-cycle where, for example, only PSD and MPD change with the fire-cycle.

In embodiments, the fire-cycle can be highly dependent on the particle size properties of the talc and alumina selected for preparing the green body.

In embodiments, the fired substrate can have, for example, a pore size distribution:

$PSD_{<2}$ of from about 6% to about 10%, $PSD_{2-5}$ of from about 32% to about 38%, $PSD_{5-10}$ from about 34% to about 41%, and a median pore diameter (MPD) of about 6 microns, has a CTE lowered by about $0.7 \times 10^{-7}/°$ C. compared to a fired substrate having a median pore diameter (MPD) of about 3 microns.

In embodiments, the thermal shock resistance (TSR) of the substrate can be improved by, for example, about 200° C.

In embodiments, the fired substrate can comprises, for example, a ceramic substrate having a high total porosity of, for example, from about 30% to about 45%, from about 32% to about 40%, from about 33% to about 35%, including intermediate values and ranges. In embodiments, the fire-cycle can include a fast-heating rate of from about 80 to about 100° C. per hour for at least one of the first (A), the second (B), the third (C), or the fourth (D) temperature range, or a combination thereof. In embodiments, the fire-cycle can include a fast-heating rate of from about 80 to about 100° C. per hour for at least the third (C), the fourth (D), or both the third (C) and the fourth (D) temperature ranges. In embodiments, the fire-cycle can include a fast-heating rate of from about 80 to about 100° C. per hour for each of the first (A), the second (B), the third (C), and the fourth (D) temperature range (factor).

In embodiments, the disclosure provides a method for making high porosity ceramic substrate comprising, for example:
  providing a green body substrate comprising:
    alumina in from about 17 to about 20 weight percent,
    talc in from about 40 to about 41 weight percent,
    silica in from about 4 to about 7 weight percent, and
    clay in from about 33 to about 38 weight percent;
  and
  firing the green body substrate for a time and at a temperature, that is a temperature range and heating rate, according to:
    heating at a first temperature range (A) from 950 to 1,050° C. at about 30 to about 85° C. per hour;
    heating at a second temperature range (B) from about 1,050 to about 1,150° C. at about 30 to about 85° C. per hour;
    heating at a third temperature range (C) at from about 1,150 to about 1,250° C. at about 85 to about 100° C. per hour; and
    heating at a fourth temperature range (D) of about 1,250 to about 1,350° C. at about 85 to about 100° C. per hour.

The fired substrate can have, for example, an average porosity from about 25 to about 40 volume %. In embodiments, a particularly useful and specific average porosity value can be, for example, 34.1 vol %. In embodiments, the fired substrate can have, for example, a pore volume of from about 0.20 to about 0.22 mL per gram. In embodiments, a particularly useful and specific pore volume is, for example, 0.2054 mL/g.

In embodiments, firing the green body substrate can be accomplished for a temperature range and at heating rate of, for example, according to:
  heating at a first range (A) from about 950 to about 1,050° C. at a heating rate of about 30° C. per hour;
  heating at a second range (B) from about 1,050 to about 1,150° C. at a heating rate of about 30° C. per hour;
  heating at a third range (C) at from about 1,150 to about 1,250° C. at a heating rate of about 100° C. per hour; and
  heating at a fourth range (D) of about 1,250 to about 1,350° C. at a heating rate of about 100° C. per hour.

The foregoing schedule can be used as a particularly useful and specific heating time to provide, for example, a fired cordierite body having the largest or maximized MPD.

In embodiments, the disclosure contemplates and provides a porous substrate prepared by any of the above mentioned processes and as described herein.

In embodiments, the disclosure provides a green body substrate, a fired-porous substrate, and porous articles thereof prepared by any of the above mentioned processes. The pore properties of the porous substrate can be predetermined and the fire-cycle accomplished to achieve the predetermined pore properties in the fired product.

In embodiments, the present disclosure provides a process for controlling the pore size distribution in a filter piece by controlling aspects of the fire-cycle. In embodiments, the present disclosure provides a process which can predict and control pore size distribution in a desired range in the resulting fired ceramic piece by controlling thermal heat rates of the fire-cycle.

In embodiments, advantages of the disclosure can include, for example, providing a system and method which provides a manufacturing operator, planner, or like staff, with the capability to adjust any fire-cycle for green body kiln firing to achieve desired pore size properties in the resulting porous ceramic piece. The method provides a useful tool, for example, for filter piece articles with regard to control of pore size properties of the fired piece, and like applications. The process can be used, for example, for the manufacture of automotive substrates, and like articles.

Commonly owned and assigned copending U.S. patent application Ser. No. 12/423,317 filed Apr. 14, 2008, mentions and shows in FIG. 9 a plot of firing profiles for diesel filter and auto substrates.

In embodiments, the present disclosure provides a process for controlling pore size properties, such as relative pore size and pore size distribution, in a honeycomb ceramic, such as a substrate piece, by controlling the heating rate profile in a temperature range sequence of, for example, from about 950 to about 1,050° C., from about 1,050 to about 1,150° C., from about 1,150 to about 1,250° C., and from about 1,250 to about 1,350° C.

In embodiments, the disclosed method and system provides a correlation between firing temperature ranges, heating rates, and pore size distribution. The disclosed method and system can also further provide validation for an alternative correlation between firing temperature ranges, heating rates, and pore size distribution.

In embodiments, the disclosed method and system provides fast-heating rates in a specific temperature region of the fire-cycle. In embodiments, a fast-heating rate, for example, of from about 80 to about 100° C. temperature change per hour at about 1,250 to about 1,350° C. provides a high pore volume for pores having an approximate diameter of about of 5 to about 10 microns. Alternatively or additionally, a fast-heat rate at from about 1,150 to about 1,250° C. per hour can further provide high pore volume for pores having diameters of about 5 to about 10 microns.

Fast heating rates of about 80 to about 100° C. per hour at from about 1,050 to about 1,150° C., then from about 1,150 to about 1,250° C. per hour, and then from about 1,250 to about 1,350° C. per hour results in high pore volumes of pores having diameters of from about 2 to about 5 microns and diameters of from about 5 to about 10 microns. This fast-heat rate fire-cycle comprising from about 2 to about 10 hours, from about 3 to about 9 hours, from about 4 to about 8 hours, and like durations, including intermediate values and ranges, is especially advantaged in that the fire-cycle does not cause a substantial reduction in porosity or overall pore volume, for example, the cycle does not reduce porosity by more than about 1 volume % compared to slower-heat rate fire-cycles. For sixteen representative firing cycles, the average porosity was about 34.1%, and the standard deviation was 0.9. The pore volume was 0.2054 mL/g, and the standard deviation was 0.0067.

Table 1 provides a general heating rate schedule (temperature and heating rate), which was used for each of the cordierite based ceramic automotive filter substrate samples prepared. Each experimental fire-cycle was accomplished using the substantially same general schedule of Table 1 with the exception of temperature range modifications in the temperature region from about 950 to about 1,350° C. Sixteen (16) representative fire-cycle modifications were examined in the range from about 950 to about 1,350° C. and are tabulated in Table 2. Thus, for example, substantially the same heat-up cycle of from about ambient temperature of about 25° C. up to about 950° C. was used for all sixteen sample substrates. Next, the specified heating schedules listed in Table 2 were used to heat (HEATING stage) each of the substrates further to 1,350° C. This was followed by heating from about 1,350° C. to a top temperature range (Top-T) of about 1,400-1,425° C., at a rate of about 30° C./hr. Next, the temperature was held substantially constant (HOLD stage) for about 6 to about 15 hours at the top temperature. Finally the temperature was lowered (COOLING stage) from the constant or HOLD temperature with a consistent cooling rate, that is, the same cooling profile for all substrates of about 100 to about 150° C./hr to ambient temperature of about 20 to 30° C. (see Table 1).

TABLE 1

Heating and cooling schedule for the fire-cycle matrix.

| Temperature range (° C.) | Ramp Rate (° C./hr) | Stage |
|---|---|---|
| 30-170 | 187 | Heating |
| 170-300 | 40 | |
| 300-850 | 75 | |
| 850-950 | 32 | |
| 950-1,350 | see Table 2 | |
| 1,350-Top T | 30 | |
| Top T | 6-15 hr hold | Hold |
| 1,410-1,250 | 100 | Cooling |
| 1,250-RT | 150 | |

TABLE 2

Fire-cycle matrix.

| | Heating rate (° C./hr) at Temp (° C.) range | | | |
|---|---|---|---|---|
| Cycle No. | A = 950 to 1,050° C. | B = 1,050 to 1,150° C. | C = 1,150 to 1,250° C. | D = 1,250 to 1,350° C. |
| 1 | 50 | 50 | 50 | 50 |
| 2 | 50 | 50 | 85 | 85 |
| 3 | 50 | 85 | 50 | 85 |
| 4 | 50 | 85 | 85 | 50 |
| 5 | 50 | 85 | 85 | 85 |
| 6 | 85 | 50 | 50 | 85 |
| 7 | 85 | 50 | 85 | 50 |
| 8 | 85 | 85 | 50 | 50 |
| 9 | 85 | 85 | 85 | 85 |
| 10 | 50 | 85 | 100 | 100 |
| 11 | 30 | 30 | 100 | 100 |
| 12 | 55 | 47 | 46 | 30 |
| 13 | 80 | 85 | 100 | 30 |
| 14 | 85 | 85 | 45 | 80 |
| 15 | 85 | 60 | 100 | 30 |
| 16 | 80 | 30 | 45 | 100 |

Referring to Table 2, fire-cycle 1 having roughly equal heating rates of 50° C./hr at the four indicated intermediate temperature ranges provided fired product which had satisfactory but less than preferred pore properties, such as a relatively high % (e.g., 16.5%) for the less than 2 micron pore size range ($PSD_{<2}$), and relatively low % (e.g., 26%) for the 5 to 10 micron pore size range ($PSD_{5-10}$) compared to fire-cycles 2, 5, 9, 10, and 11, and as listed in Table 3. In contrast, fire-cycles 2, 5, 9, 10, and 11 provided excellent pore size distribution properties for selected pore size ranges such as a relatively low % (e.g., 5.5 to 9.5%) of the less than 2 micron pore size range ($PSD_{<2}$), and relatively high % (e.g., about 36 to about 42.5%) for the 5 to 10 micron pore size range ($PSD_{5-10}$). Although not bound by theory, it is believed that the heating rate profiles for fire-cycles 2, 5, 9, 10, and 11 provided fired substrates having superior pore size distribution properties. It is also noteworthy that the total porosity (% P) of the respective substrates remained relatively constant and (unlike the pore size distribution) did not vary significantly as a function of the fire-cycle profile.

Referring to the Figures, FIG. 1 shows exemplary fire-cycle profiles for cycle numbers 1, 9, and 11. The initial heat-up to 950° C., the top temperature, the hold-time at top temperature, and cooling were kept consistent among the fire-cycles that were compared, that is, the same heating and cooling schedule shown in Table 1 was used among all the fire-cycles compared with the abovementioned exception of the fire-cycle segment listed in Table 2.

Figure 2:
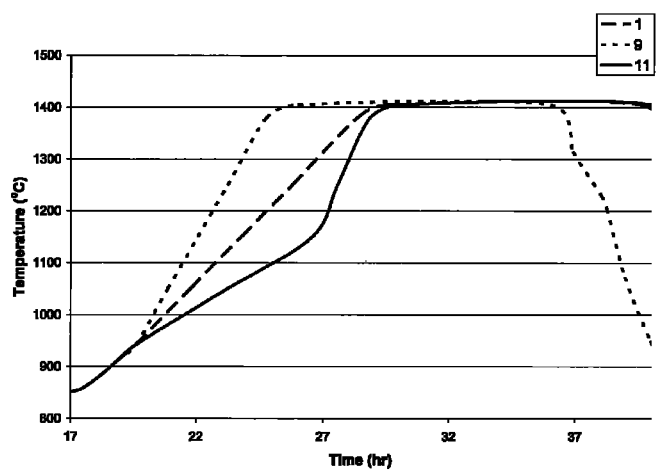
FIG. 2 shows a magnified portion of interest from FIG. 1.

FIG. 2 shows a magnified portion of interest from FIG. 1, such as from about 17 to about 40 hrs and more specifically from about 20 to about 30 hrs for further viewing clarity. Cycles 1, 9, and 11, show exemplary temperature range profiles.

TABLE 3

Porosity data of the firing cycles of Tables 1 and 2.

| Fire-cycle no. | Pore size range (PSD in microns) | | | | | | Total Porosity % | MPD (microns) |
|---|---|---|---|---|---|---|---|---|
| | $PSD_{<2}$ | $PSD_{2-5}$ | $PSD_{5-10}$ | $PSD_{10-20}$ | $PSD_{20-40}$ | $PSD_{>40}$ | | |
| 1 | 16.50 | 43.81 | 26.00 | 8.87 | 2.99 | 1.82 | 33.57 | 4.10 |
| 2 | 9.54 | 36.62 | 35.85 | 12.34 | 3.91 | 1.74 | 34.08 | 5.27 |
| 3 | 14.16 | 42.08 | 30.79 | 9.01 | 2.71 | 1.25 | 34.97 | 4.50 |
| 4 | 13.09 | 45.22 | 28.73 | 9.31 | 2.78 | 0.88 | 34.54 | 4.37 |
| 5 | 8.33 | 36.82 | 37.31 | 11.34 | 3.74 | 2.45 | 34.01 | 5.31 |
| 6 | 13.67 | 42.59 | 30.79 | 9.09 | 2.84 | 1.02 | 34.39 | 4.50 |
| 7 | 10.99 | 41.74 | 31.37 | 9.65 | 3.40 | 2.84 | 32.79 | 4.72 |

TABLE 3-continued

Porosity data of the firing cycles of Tables 1 and 2.

| Fire-cycle no. | Pore size range (PSD in microns) | | | | | | Total Porosity % | MPD (microns) |
| --- | --- | --- | --- | --- | --- | --- | --- | --- |
| | $PSD_{<2}$ | $PSD_{2-5}$ | $PSD_{5-10}$ | $PSD_{10-20}$ | $PSD_{20-40}$ | $PSD_{>40}$ | | |
| 8  | 17.55 | 41.88 | 23.45 | 8.35  | 2.92 | 5.85 | 34.65 | 4.13 |
| 9  | 8.00  | 36.41 | 36.99 | 12.34 | 3.73 | 2.53 | 34.15 | 5.41 |
| 10 | 8.58  | 34.75 | 38.01 | 12.28 | 3.92 | 2.45 | 34.48 | 5.52 |
| 11 | 5.52  | 31.70 | 42.45 | 13.76 | 4.17 | 2.41 | 32.90 | 5.95 |
| 12 | 26.03 | 45.99 | 16.63 | 6.74  | 2.41 | 2.19 | 33.37 | 3.17 |
| 13 | 17.01 | 47.26 | 24.28 | 7.70  | 2.46 | 1.28 | 33.38 | 3.86 |
| 14 | 14.42 | 40.05 | 29.95 | 9.62  | 3.11 | 2.86 | 33.87 | 4.58 |
| 15 | 15.58 | 46.40 | 24.56 | 8.29  | 2.88 | 2.29 | 33.47 | 3.98 |
| 16 | 13.71 | 37.54 | 31.77 | 11.72 | 3.69 | 1.56 | 35.02 | 4.83 |

Figure 3:
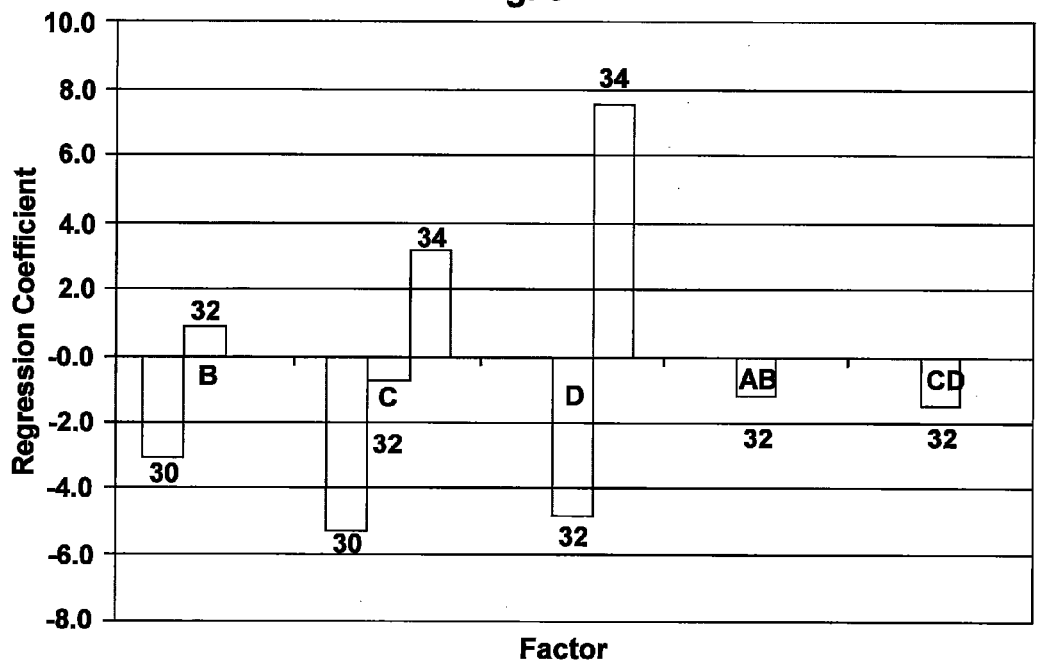
FIG. 3 shows regression coefficient results for pore size distributions as a function of firing temperature ranges.

Data analysis accomplished using DOE PRO XL (a Design of Experiments software package available from sigmazone.com), showed a strong correlation between the fire-cycle parameters and the observed pore size distribution (PSD) responses. $R^2$ values were 0.8181, 0.9123, and 0.8816 for PSD of less than 2 microns ($PSD_{<2}$), 2 to 5 microns ($PSD_{2-5}$), and 5 to 10 microns ($PSD_{5-10}$), respectively, and as listed in Table 4. FIG. 3 shows the relationship of regression coefficient results for pore size distributions as a function these firing temperature ranges. The regression coefficients in FIG. 3 for pore sizes or pore size distribution (PSD) of less than 2 microns ($PSD_{<2}$) (30), pore sizes or pore size distribution of 2 to 5 micron pore size range ($PSD_{2-5}$) (32), and pore sizes or pore size distribution of 5 to 10 micron pore size range ($PSD_{5-10}$) (34) showed that the 1,250 to 1,350° C. temperature range was the most significant range for obtaining the desired 2 to 5 micron pore size range, and the 5 to 10 micron pore size range. Fast-heating in this temperature range only and a slow heating rate in the other temperature ranges can increase pore volume of the about 5 to about 10 micron pore size content while reducing the about 2 to about 5 micron pore size content. The temperature factor or temperature ranges were A=950-1,050° C., B=1,050-1,150° C., C=1,150-1,250° C., and D=1,250-1,350° C., and as indicated in Table 3. An "AB" is the interaction of temperature factor A and temperature factor B, and a "CD" is interaction of temperature factor C and temperature factor D.

distribution. Pore compensation (i.e., adjusted pore size) was achieved within the first firing trial.

Generally, a high-fast-long (HFL) fire-cycle as represented by fire-cycle 9 provided a fired cordierite substrate having a pore volume of about 0.1063 mL/g for 5 micron pore size.

A predictive model was used to determine fire-cycle parameters to compensate or adjust the pore volume. Thus, the heating rate at about 1,250° C. to about 1,350° C. temperature range was adjusted to 40° C./hr for a pore-compensation high-fast-long (PC-HFL) cycle, instead of the 85° C./hr as used previously in HFL cycle, with the result that a reduction of 5 micron pore volume material to 0.0795 mL/g was achieved while lowering coefficient of thermal expansion (CTE) and increasing maintaining the modulus of rupture (MOR) which can further provide a benefit of increasing the thermal shock resistance (TSR). The Y-hat model is a linear least-squares regression, which fits a straight line to data. If a variable y is linearly related to x, then one can use the formula for a line. The pore size distribution of less than 2 microns (40) had a fitted line y=0.8776x+1.7531. The pore size distribution of about 2 to about 5 microns (42) had a fitted line y=0.9394x+1.799 and $R^2$=0.9394. The pore size distribution of about 5 to about 10 microns (45) had a fitted line y=0.9632x+1.4969 and $R^2$=0.9632. $R^2$ is a measure of the fit of the regression model. An $R^2$ value of 1 means the model has a perfect fit.

TABLE 4

Multiple response regression of pore size distribution as a function of firing parameters.

| | | $PSD_{<2}$ microns | | | $PSD_{2-5}$ microns | | | $PSD_{5-10}$ microns | | |
| --- | --- | --- | --- | --- | --- | --- | --- | --- | --- | --- |
| Y-hat Model | | | P | | | P | | | P | |
| Factor | Name | Coeff. | (2 Tail) | Tol | Coeff. | (2 Tail) | Tol | Coeff. | (2 Tail) | Tol |
| Const. | | 14.844 | 0.000 | | 41.102 | 0.000 | | 28.955 | 0.000 | |
| B | 1,050-1,150 | | | | 0.864 | 0.005 | 0.897 | | | |
| C | 1,150-1,250 | −3.114 | 0.000 | 0.999 | −0.798 | 0.004 | 0.960 | 3.181 | 0.000 | 0.999 |
| D | 1,250-1,350 | −5.278 | 0.000 | 0.999 | −4.816 | 0.000 | 0.916 | 7.567 | 0.000 | 0.999 |
| AB | | | | | −1.229 | 0.003 | 0.846 | | | |
| CD | | | | | −1.503 | 0.000 | 0.879 | | | |
| $R^2$ | | 0.820 | | | 0.939 | | | 0.908 | | |

Figure 4:
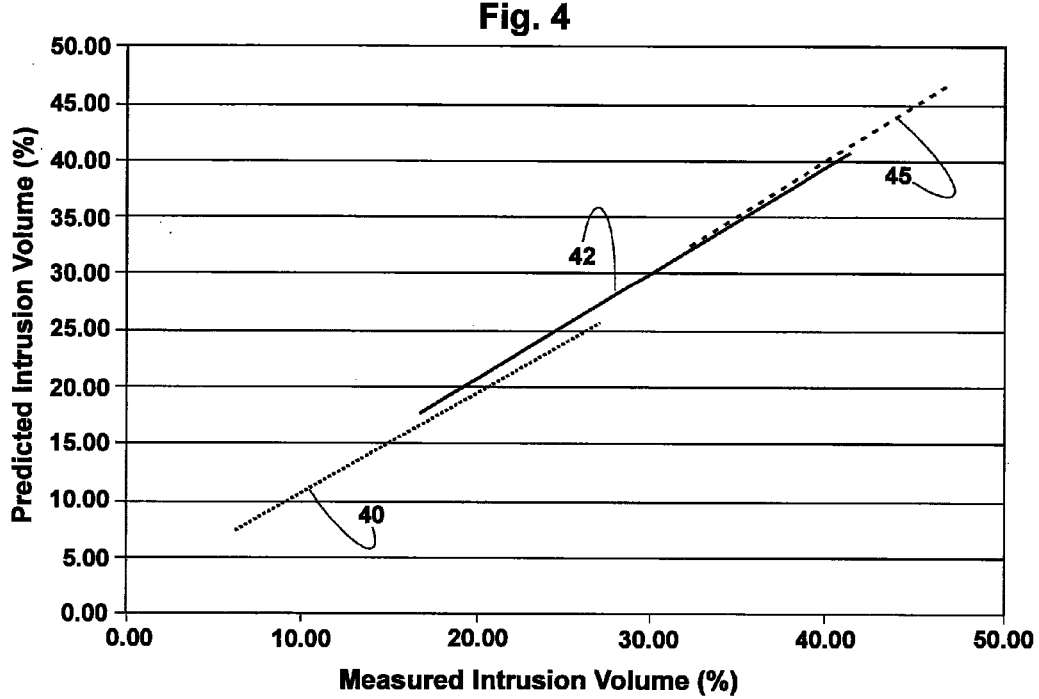
FIG. 4 shows correlations between the predicted and measured pore intrusion volumes.

FIG. 4 shows correlations between the predicted and measured pore intrusion volumes. A strong correlation was observed between the predicted and measured intrusion volume. The method can be used to achieve desired pore size The factors A, B, C, and D were the main effect and represent the temperature ranges of the design. AB and CD were the interactions of the main effect. The factor A was determined not to be significant in the temperature range of about 950 to about 1,050° C. "Tol" is the tolerance which represents orthogonality for each term. A tolerance of one (1) is orthogonal. A tolerance of less than one indicates multi-collinearity. "P(2 Tail)" is a measure of the significance of an effect. A P(2 Tail) of less than 0.05 is considered highly significant.

EXAMPLES

The following examples serve to more fully describe the manner of using the above-described disclosure, as well as to set forth the best modes contemplated for carrying out various aspects of the disclosure. It is understood that these examples do not limit the scope of this disclosure, but rather are presented for illustrative purposes. The working examples further describe how to prepare the porous articles of the disclosure.

The PSD can be predicted from the heating rate at a designed temperature range using a predictive model (DOE PRO XL software). The designed temperature range can be obtained from temperatures where the key material (e.g. talc, alumina, silica) reactions significantly respond to the fire-cycle to generate a desired pore size. The PSD can be predicted when one varies the fire-cycle matrix. Alternatively, the fire-cycle matrix can be designed from a desired PSD.

The measured intrusion volume plot, obtained by mercury intrusion porosimetry or like methods, can be used to validate that the pore size distribution (PSD) provided by the model. The predicted PSD fits well with the actual measured values.

An exemplary procedure for predicting and controlling the pore size distribution of the fired substrate follows.

PSD Prediction:
1. Enter the desired heating rate for each temperature range (i.e., factor), such as temperature ranges A=950-1,050° C., B=1,050-1,150° C., C=1,150-1,250° C., and D=1,250-1,350° C., in the final regression model from DOE PRO XL software (see "Experimental Heating Rate" column in Table 5).

TABLE 5

| Factor | Temperature Range (° C.) | Low-Heating Rate (° C./hour) | High-Heating Rate (° C./hour) | Experimental Heating Rate (° C./hour) |
|---|---|---|---|---|
| A | 950-1,050 | 30 | 85 | 40 |
| B | 1,050-1,150 | 30 | 85 | 100 |
| C | 1,150-1,250 | 45 | 100 | 85 |
| D | 1,250-1,350 | 30 | 100 | 100 |

2. The $PSD_{<2}$, $PSD_{2-5}$, and $PSD_{5-10}$ microns is calculated and presented in the Y-hat column in Table 6. "S-hat" refers to the standard error.

TABLE 6

| Multiple Response Prediction | | | 99% Confidence Interval | |
|---|---|---|---|---|
| | Y-hat | S-hat | Lower Bound | Upper Bound |
| $PSD_{<2}$ | 8.1501 | 0.6071 | 6.329 | 9.971 |
| $PSD_{2-5}$ | 37.7838 | 0.2395 | 37.065 | 38.502 |
| $PSD_{5-10}$ | 37.9676 | 0.6360 | 36.059 | 39.876 |

3. The PSD is refined according to:
 a. Select the multiple response refinement from DOEPRO tab in the DOE PRO XL software;
 b. Enter and add the Y-hat constraint for each PSD (i.e., $PSD_{<2}$, $PSD_{2-5}$, and $PSD_{5-10}$ in microns);
 c. Refine the desired constraints;
 d. Calculate the heating rate of each temperature range to obtain the desired PSD and as reported in the "Optimal Input Settings" window of the software, such as 950-1,050° C.=30; 1,050-1,150° C.=85; 1,150-1,250° C.=100; 1,250-1,350° C.=30.

Example 1

Preparation of a Green Body

A green body was prepared according to U.S. Pat. No. 5,332,703, entitled "Batch compositions for cordierite ceramics," and 6,221,308, entitled "Method of Making Fired Bodies," both assigned to Corning, Inc.

Example 2

Firing the Green Body

A green body was fired generally in accord with equipment and handling disclosed in U.S. Pat. No. 6,089,860, assigned to Corning, Inc., entitled "Method for firing ceramic honeycomb bodies and a tunnel kiln used therefore."

Example 3

Talc Particle Size Relationship

A fire-cycle study showed that the impact of the heating rate on the pore size distribution (PSD), mean particle diameter (MPD), or both, for a composition containing coarse talc, had little or insignificant impact for a composition having very fine talc particle size. The heating rate can effectively alter the PSD, MPD, or both, in the temperature ranges of 1,150-1,350° C. due to "talc melting" and "transient melting" reactions of coarser raw material particles. For finer raw materials more complete reactions occur sooner and thus inhibit large pore evolution. The MPD of a composition with fine talc remained the same for different firing cycles.

TABLE 7

| | MPD (microns) of composition with | |
|---|---|---|
| Fire-cycle | Coarse talc | Fine talc |
| 1 | 4.09 | 1.2 |
| 2 | 5.11 | 1.3 |
| 3 | 4.42 | 1.2 |
| 4 | 4.16 | 1.4 |
| 5 | 5.22 | 1.4 |
| 6 | 4.47 | 1.4 |
| 7 | 4.46 | 1.3 |
| 8 | 4.09 | 1.4 |
| 9 | 5.26 | 1.4 |
| 10 | 5.88 | 1.4 |

It is also noted that finer alumina in the batch can also contribute to the smaller pore sizes. However, it appears that for the disclosed examples that significant pore size distribution control is driven by the particle size of the talc raw material selected.

Heating Rate Prediction from Pore Size Distribution (PSD)

Data of % intrusion volume of pore size less than 2 microns, from 2 to 5 microns, and from 5 to 10 microns, were used as input factors. The heating rate of temperature ranges 950-1,050° C., 1,050-1,150° C., 1,150-1,250° C., and 1,250-1,350° C. were used as responses for the design of experiment (DOE), Table 8. The prediction of heating rate for 1,150 to 1,250° C., and 1,250 to 1,350° C. were reliable based from $R^2$ values of Table 9.

TABLE 8

Input factors of % intrusion volume and responses

| % Intrusion volume of pore size | | | | Designed heating rate (° C./hr) at | | | |
|---|---|---|---|---|---|---|---|
| <2 microns | 2-5 microns | 5-10 microns | Cycle No. | 950-1050° C. | 1050-1150° C. | 1150-1250° C. | 1250-1350° C. |
| 17.22 | 43.09 | 26.51 | 1 | 50 | 50 | 50 | 50 |
| 10.45 | 37.65 | 34.46 | 2 | 50 | 50 | 85 | 85 |
| 15.41 | 41.97 | 29.43 | 3 | 50 | 85 | 50 | 85 |
| 15.83 | 45.08 | 26.56 | 4 | 50 | 85 | 85 | 50 |
| 9.24 | 37.17 | 36.17 | 5 | 50 | 85 | 85 | 85 |
| 15.24 | 41.36 | 30.15 | 6 | 85 | 50 | 50 | 85 |
| 13.39 | 42.56 | 29.10 | 7 | 85 | 50 | 85 | 50 |
| 18.10 | 42.13 | 22.70 | 8 | 85 | 85 | 50 | 50 |
| 8.90 | 37.24 | 35.88 | 9 | 85 | 85 | 85 | 85 |
| 9.37 | 35.39 | 37.10 | 10 | 50 | 85 | 100 | 100 |
| 6.25 | 32.19 | 41.44 | 11 | 30 | 30 | 100 | 100 |
| 27.10 | 44.92 | 16.84 | 12 | 55 | 47 | 46 | 30 |
| 17.79 | 46.64 | 23.41 | 13 | 80 | 85 | 100 | 30 |
| 14.58 | 39.80 | 29.60 | 14 | 85 | 85 | 45 | 80 |
| 17.12 | 46.53 | 23.83 | 15 | 85 | 60 | 100 | 30 |
| 13.10 | 37.50 | 32.10 | 16 | 80 | 30 | 45 | 100 |

TABLE 9

Regression model for heating rate prediction

| | | Temperature range | | | |
|---|---|---|---|---|---|
| Factor | Name | 950-1,050° C. | 1,050-1,150° C. | 1,150-1,250° C. | 1,250-1,350° C. |
| | | Coeff | Coeff | Coeff | Coeff |
| Const | | 71.982 | 65.438 | 41.355 | 93.773 |
| A | PSD <2 | | | | 74.009 |
| B | PSD 2-5 | | | | -33.744 |
| C | PSD 5-10 | | | 47.036 | 81.385 |
| AB | | -34.924 | | -343.45 | -36.513 |
| AC | | | | -145.90 | |
| BC | | | | -218.59 | |
| | $R^2$ | 0.3154 | 0.0000 | 0.9076 | 0.9545 |

Reliable heating rate (HR) prediction for 1,150 to 1,250° C., and 1,250 to 1,350° C. can be calculated from the following respective equations.

$$HR_{(1150\text{-}1250°\,C.)} = 41.354 + 47.036*((Pc-AvPc)/RPc) + (-343.454)*((Pa-AvPa)/RPa)*((Pb-AvPb)/RPb) + (-146.896)*((Pa-AvPa)/RPa)*((Pc-AvPc)/RPc) + (-218.591)*((Pb-AvPb)/RPb)*((Pc-AvPc)/RPc)$$

$$HR_{(1250\text{-}1350°\,C.)} = 93.773 + (74.009)*((Pa-AvPa)/RPa) + (-33.744)*((Pb-AvPb)/RPb) + (81.385)*((Pc-AvPc)/RPc) + (-36.513)*((Pa-AvPa)/RPa)*((Pb-AvPb)/RPb)$$

where:
P is the pore size distribution in % vol,
a, b and c represent pore size <2, 2 to 5, and 5 to 10 microns, respectively,
% intrusion volume of:
$P_{<2}$ was from a low of 6.25, to a high of 27.10
$P_{2\text{-}5}$ was from a low of 32.19, to a high of 46.64
$P_{5\text{-}10}$ was from a low of 16.84, to a high of 41.44 (from Table 8)
Av is the average of the low and high P values, e.g., AvPa is the average of $P_{<2}$, and
R is the range of the low and high P values divided by 2, e.g., RPa is the range of $P_{<2}$.

The predicted heating rates are compared to the designed heating rate in Table 10.

TABLE 10

Regression model predicted heating rates for 1,150 to 1,250° C. and 1,250 to 1,350° C.

| | Designed heating rate (° C./hr) at | | | | Predicted heating rate (° C./hr) at | | | |
|---|---|---|---|---|---|---|---|---|
| Cycle No. | 950-1,050° C. | 1,050-1,150° C. | 1,150-1,250° C. | 1,250-1,350° C. | 950-1,050° C. | 1,050-1,150° C. | 1,150-1,250° C. | 1,250-1,350° C. |
| 1 | 50 | 50 | 50 | 50 | 71 | 68 | 61 | 61 |
| 2 | 50 | 50 | 85 | 85 | 67 | 62 | 74 | 88 |
| 3 | 50 | 85 | 50 | 85 | 74 | 67 | 61 | 75 |
| 4 | 50 | 85 | 85 | 50 | 74 | 70 | 88 | 45 |
| 5 | 50 | 85 | 85 | 85 | 64 | 62 | 83 | 91 |
| 6 | 85 | 50 | 50 | 85 | 73 | 66 | 57 | 81 |
| 7 | 85 | 50 | 85 | 50 | 77 | 67 | 81 | 59 |
| 8 | 85 | 85 | 50 | 50 | 70 | 67 | 52 | 45 |
| 9 | 85 | 85 | 85 | 85 | 64 | 62 | 86 | 86 |
| 10 | 50 | 85 | 100 | 100 | 58 | 60 | 79 | 101 |
| 11 | 30 | 30 | 100 | 100 | 36 | 56 | 112 | 104 |
| 12 | 55 | 47 | 46 | 30 | 43 | 70 | 31 | 35 |
| 13 | 80 | 85 | 100 | 30 | 68 | 72 | 99 | 26 |
| 14 | 85 | 85 | 45 | 80 | 73 | 64 | 52 | 79 |

TABLE 10-continued

Regression model predicted heating rates for 1,150 to 1,250° C. and 1,250 to 1,350° C.

| Cycle No. | Designed heating rate (° C./hr) at | | | | Predicted heating rate (° C./hr) at | | | |
|---|---|---|---|---|---|---|---|---|
| | 950–1,050° C. | 1,050–1,150° C. | 1,150–1,250° C. | 1,250–1,350° C. | 950–1,050° C. | 1,050–1,150° C. | 1,150–1,250° C. | 1,250–1,350° C. |
| 15 | 85 | 60 | 100 | 30 | 70 | 72 | 101 | 26 |
| 16 | 80 | 30 | 45 | 100 | 69 | 62 | 50 | 93 |

Additional equations for 950 to 1,050° C., and 1,050 to 1,150° C.:
$HR_{(950\text{-}1050°C.)} = 71.982 + (-34.924)*((Pa - AvPa)/RPa)*((Pb - AvPb)/RPb)$
$HR_{(1050\text{-}1150°C.)} = 65.438$ The disclosure has been described with reference to various specific embodiments and techniques. However, it should be understood that many variations and modifications are possible while remaining within the spirit and scope of the disclosure.

What is claimed is:

1. A method for pore size distribution control in a fired ceramic article comprising:
    selecting a batch composition for a green body precursor to the fired ceramic article;
    selecting a pore size distribution in the fired ceramic article comprising a first, a second, and a third pore size distribution;
    calculating a heating-rate (HR) in ° C./hour for firing the green body precursor at a first temperature range (A) of 950 to 1,050° C., a second temperature range (B) of 1,050 to 1,150° C., a third temperature range (C) of 1,150 to 1,250° C., and a fourth temperature range (D) of 1,250 to 1,350° C., respectively, according to:

$HR_{(950\text{-}1150°C.)} = 71.982 + (-34.924)*((Pa-AvPa)/RPa)*((Pb-AvPb)/RPb);$ $HR_{(1050\text{-}1150°C.)} = 65.438;$ $HR_{(1150\text{-}1250°C.)} = 41.354 + 47.036*((Pc-AvPc)/RPc) + (-343.454)*((Pa-AvPa)/RPa)*((Pb-AvPb)/RPb) + (-146.896)*((Pa-AvPa)/RPa)*((Pc-AvPc)/RPc) + (-218.591)*((Pb-AvPb)/RPb)*((Pc-AvPc)/RPc);$ and $HR_{(1250\text{-}1350°C.)} = 93.773 + (74.009)*((Pa-AvPa)/RPa) + (-33.744)*((Pb-AvPb)/RPb) + (81.385)*((Pc-AvPc)/RPc) + (-36.513)*((Pa-AvPa)/RPa)*((Pb-AvPb)/RPb),$ where
    P is the pore size distribution in % vol,
    a, b and e represent the first, second, and third pore size distributions of <2, 2 to 5, and 5 to 10 microns, respectively, for low to high % intrusion volumes of:
        $P_{<2}$ from 6.25 to 27.10;
        $P_{2\text{-}5}$ from 32.19 to 46.64; and
        $P_{5\text{-}10}$ from 16.84 to 41.44;
    Av is the average of the low and high P values,
    R is the range of the low and high P values divided by 2; and
    firing a green body precursor having the selected batch composition according to the calculated heating-rate, the median pore size diameter (MPD) of the fired ceramic article being greater than or equal to 5 micrometers.

2. The method of claim 1 further including a pre-heat schedule prior to firing at the calculated heating-rate, a consistent maximum temperature during firing, a consistent hold time during firing, and a consistent cool down cycle.

3. The method of claim 1, wherein the green body substrate comprises a batch composition comprising alumina and talc.

4. The method of claim 3, wherein the talc comprises particles having a median particle size of about 10 to about 16 microns, in from about 35 to about 45 weight percent of the total weight percent of the green body.

5. The method of claim 1, wherein the porosity of the fired ceramic article is constant within a fired article and between like fired articles.

6. The method of claim 1, wherein the heating-rate is independent of the composition of the fired article.

7. The method of claim 1, wherein the heating-rate depends on the particle size properties of the ingredients of the batch composition selected for preparing the green body.

8. The method of claim 7, wherein the ingredients selected for the batch composition include talc and alumina.

9. The method of claim 1, wherein the fired ceramic article has a pore size distribution in vol % comprising:
    $PSD_{<2}$ of from 6% to 10%,
    $PSD_{2\text{-}5}$ of from 32% to 38%,
    $PSD_{5\text{-}10}$ from 34% to 41%, and
    a median pore diameter (MPD) of about 6 microns.

10. The method of claim 1, wherein the fired ceramic article comprises a ceramic having a total porosity of from about 33% to about 35 volume %.

11. The method of claim 1, wherein the heating-rate includes a fast-heating rate of from about 80 to about 100° C. per hour for at least one of the first (A), the second (B), the third (C), the fourth (D) temperature range, or a combination thereof.

12. The method of claim 1, wherein the heating-rate includes a fast-heating rate of from about 80 to about 100° C. per hour for at least the third (C), the fourth (D), or both the third (C) and the fourth (D) temperature ranges.

13. The method of claim 1, wherein the heating-rate includes a fast-heating rate of from about 80 to about 100° C. per hour for each of the first (A), the second (B), the third (C), and the fourth (D) temperature ranges.

14. A method for making high porosity ceramic substrate comprising:
    providing a green body substrate comprising:
        alumina in from about 17 to about 20 weight percent,
        talc in from about 40 to about 41 weight percent,
        silica in from about 4 to about 7 weight percent, and
        clay in from about 33 to about 38 weight percent;
    and
    firing the green body substrate for a time and at a temperature according to:
        heating at a first temperature range (A) from 950 to 1,050° C. at about 30 to about 85° C. per hour;
        heating at a second temperature range (B) from about 1,050 to about 1,150° C. at about 30 to about 85° C. per hour;

heating at a third temperature range (C) at from about 1,150 to about 1,250° C. at about 85 to about 100° C. per hour; and heating at a third temperature range (D) of about 1,250 to about 1,350° C. at about 85 to about 100° C. per hour.

15. The method of claim 14 wherein the fired substrate has an average porosity from about 25 to about 40 volume %.

16. The method of claim 14 wherein the fired substrate has a pore volume of from about 0.20 to about 0.22 mL per gram.

17. The method of claim 14 wherein firing the green body substrate for a time and at a temperature range is according to:

heating at the first range (A) from 950 to 1,050° C. at a heating rate of about 30° C. per hour;

heating at the second range (B) from about 1,050 to about 1,150° C. at a heating rate of about 30° C. per hour;

heating at the third range (C) at from about 1,150 to about 1,250° C. at a heating rate of about 100° C. per hour; and heating at the fourth range (D) of about 1,250 to about 1,350° C. at a heating rate of about 100° C. per hour.

* * * * *